R. P. PICTET.
ART OF FUSING ORES.
APPLICATION FILED OCT. 29, 1913. RENEWED MAY 12, 1917.
1,230,431.
Patented June 19, 1917.
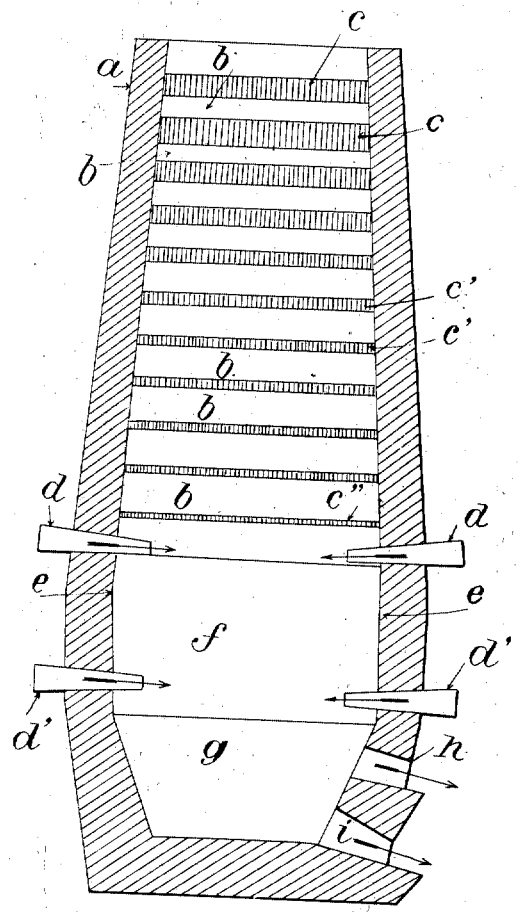

UNITED STATES PATENT OFFICE.

RAOUL PIERRE PICTET, OF PARIS, FRANCE.

ART OF FUSING ORES.

1,230,431. Specification of Letters Patent. Patented June 19, 1917.

Application filed October 29, 1913, Serial No. 798,056. Renewed May 12, 1917. Serial No. 168,316.

*To all whom it may concern:*

Be it known that I, RAOUL PIERRE PICTET, of 21 Rue de la Rochefoucauld, Paris, France, engineer, have invented a new and useful Art of Fusing Ores, which improvement is fully set forth in the following specification.

At the present time in all blast furnaces iron ores are worked by the known reducing action of carbonic oxids upon the ferric oxids.

The furnace is filled with superposed layers of ore and carbon which becomes increasingly incandescent in its descent to the bottom of the furnace.

The oxygen of the metal transforms the carbonic oxid which is formed at the lower portion of the furnace by the action of a powerful current of air passing into the lower layers of the blast furnace, into carbonic acid; the incandescent layer of carbon transforms the carbonic acid into carbonic oxid thus allowing the layer of mineral above it to be reduced and so on.

The excess of carbon brought to very high temperatures at the bottom of the furnace causes the fusion of the gangue which becomes slag and of the iron which passes out as cast or carburized iron.

This invention has for its object a new process which allows uncarburized soft iron and a completely fluid slag to be obtained at the bottom of the furnace even from the most refractory minerals.

The theory of the new process is the following:—

First a very exact analysis of the constitution of the ore is made to ascertain what oxid of iron is to be reduced and the weight of carbon necessary for this operation.

By analysis of the gangues it is known to what temperature they must be brought for complete fusion.

When these two points are known a blast furnace is built which is very similar to the usual type but differs in one essential particular. The lower base of the furnace is formed of two superposed sections one of which is supplied with a special current of carbonic oxid led in through nozzles by blowers.

The upper nozzles are supplied with the ordinary air blast while the lower nozzles are supplied partly with a current of carbonic oxid and partly with a current of air mixed with more or less commercial oxygen.

The blast nozzles of the lower section cause by their proximity an intimate mixture between the carbonic oxid and the commercial oxygen.

The content in oxygen with respect to the nitrogen and the ratio of the volume of oxygen blown into the volume of the carbonic oxid should be known with exactitude and be regulable, this being an essential condition.

It may be supposed for example for the sake of clearness that the ores present represent 29% of oxygen with respect to the weight of pure iron contained in the gangue.

It is known that for a content of soft iron a certain and exactly calculable weight of carbon is required to transform the oxygen linked to the iron of the oxids to be treated into carbonic oxid.

By studying the gangues it will be found for example that it is necessary to bring them to a temperature of 1750° C. in order to fuse them and that they contain titanium or silicion in certain quantities.

It is then known that in order properly to fuse the slag, a certain mixture of oxygen and nitrogen is necessary which will furnish with the carbonic oxid a temperature of at least 1760° to 1770° C.; this temperature is slightly greater than the fusing point of these gangues because the gases of combustion should furnish the latent heat of fusion at this raised temperature.

When these two points are fundamentally known for a given quality of ore, a gasometer is filled with the mixture of oxygen and nitrogen which will furnish for the combustion of a given volume of carbonic oxid, a temperature in accordance with the analyses and the fusing points and a blowing compressor is fed with said commercial oxygen. Carbonic oxid mixed or not with nitrogen is stored in a second gasometer.

The carbonic oxid may be directly collected from the blast furnace or made in any desired manner.

The relative proportions of the carbonic oxid and the commercial oxygen which should be blown into the base of the furnace to attain the temperature on the one hand are known, and also with normal working of the blast furnace the quantity of heat necessary on the other hand completely to fuse the iron and the slag.

The two blasts are regulated with exactitude, one acting by the compression of the commercial oxygen into doses of oxygen, the other furnishing the necessary volume of carbonic oxid and owing to such combustion effected at the bottom of the blast furnace the iron and the slag will flow out continuously.

The iron will be soft and carburized as desired.

For if the layers of carbon and ores be superposed in proportions such that the reduction of the iron absorbs all the carbon, the iron will only fuse in contact with the carbonic oxid and the oxygen and will not be contaminated with any carbon because this will have completely disappeared in the reducing layers of the blast furnace.

But fusion under these conditions will not to any degree furnish cast iron. The iron will be soft and will remain so during fusion.

If on the contrary it is desired to leave a certain quantity of carbon in the iron it is necessary to add this quantity to the carbon placed in the parallel layers introduced into the blast furnace with the layers of ores and such additional carbon will be found with exactitude in the melted metal.

The temperature of the flame produced by the carbonic oxid and the oxygen will be regulated only by the necessity of the complete fusion of the ore for without this there will be danger of obstructions.

The gases which rise to the top of the furnace above the section where fusion of the ore takes place are added to the atmospheric air which has for its object the reduction of the carbonic oxid contained in the superposed layers.

All the oxygen and the carbonic oxid only increase the volume of the reducing gases.

When the ores contain silicon and titanium the temperature of fusion may attain 1800° C.

The gases which pass out of this zone operate under these conditions at a higher temperature than in the case of ordinary less refractory ores, the reduction of the oxids at this high temperature is much more rapid.

The drawing illustrates diagrammatically in section a blast furnace for carrying out this invention.

$a$ are the walls formed of highly refractory bricks.

The superposed layers of ore and carbon are introduced through the mouth of the furnace.

$b$ represents the ore and $c$ the layers of carbon.

As the layers descend of themselves the thickness of the layers becomes less.

In the drawings these layers are shown equidistant in order to show by the shading the thickness of the layers $c$ of carbon at the top; $c'$ shows the thickness of the central layers and $c''$ the last layer of carbon above that portion of the furnace where fusion takes place. The twyers $d$ $d$ lead in atmospheric air which has passed through ordinary heaters to raise its temperature before the entry of the gases into the reducing zone, the twyers $d'$ lead in carbonic oxid and air containing more or less commercial oxygen.

$e$ is the fusion zone of the iron and slag.

The chamber $f$ is therefore brought by a combined systematic combustion to the critical temperature of the fusing point of the ore and the immediate separation of the fused soft iron from the slag.

These two fused liquids fall into the pocket $g$ where they pass out through the orifices $h$ and $i$, the slag at $h$ and the iron at $i$.

The pocket $g$ may of course operate as a Bessemer converter.

Oxygenized air may be blown in at the bottom of the pocket if it be desired to complete the purification of the metal. If therefore it is desired to resume the normal working of the blast furnace according to the rules of the new process one proceeds as follows:

At the bottom of the blast furnace there flows out constantly or intermittently a pure metal transformed according to the nature of the materials directly introduced for this purpose into steel of the quality desired or as soft iron without carbon or impurity. The metal passes out at $i$ and represents the normal output of the blast furnace. The molten slag separates from the metal, floats at the surface and passes away at $h$.

Above these fused masses gaseous currents are led in consisting of carbonic oxid, oxygen and nitrogen retained in the mixture as a temperature regulator.

If the chamber $f$ the fusion zone $e$ the ore fuses rapidly however refractory the elements forming the gangue may be.

The gases coming from the ordinary blower pass through the twyers $d$ and mix with the very hot gases passing out of the chamber $f$.

Carbonic acid in small quantities associated with carbonic oxid, with the oxygen remaining and with the nitrogen convert into carbonic oxid the last traces of carbon in the layer $c''$ and pass at a high temperature and near the temperature of fusion in the layer $b$ brought to the same temperature.

The reduction of the ore in this lower zone of the reduction chamber is very active.

The gases which pass in through the numerous twyers $d$ are heated by heating pipes formed in the thickness of the walls of the blast furnace or by any other arrangement.

The gases rise in the furnace and cause the progressive reduction of the ore by transforming into carbonic oxid the carbonic acid formed by the oxygen taken from the oxids by the carbonic oxid.

The temperature falls and in the upper layers of the ore carbonic oxid can no longer reduce the ferric oxids.

Commencing at this place the gases only operate by their specific heat and give up their heat to raise the temperature of the layers passing downward. At the mouth of the furnace there are found only small quantities of carbonic acid but large quantities of carbonic oxid and nitrogen.

These gases are collected and the carbonic oxid compressors are fed from the pipes for the outlet of the gas and furnish the volume of carbonic oxid necessary for the fusion of the ores in the chamber $g$.

The excess of carbonic oxid produced may be employed for any desired purpose.

The action of the blast furnace is therefore continuous and need only be interrupted when a change is required in the quality of the product. In effect the preparation of steel, the introduction of special material, the blowing of the mass, require for each tapping a certain time for preparation but do not affect in any way the normal and continuous treatment of the ores. All the material of the blast furnace, the bases of the blowers, the inner lining of the walls of the chambers $e$ and $f$, are specially selected to resist the highest temperatures.

It is obvious that this invention may be applied to the treatment of other metals than iron.

Claims:

1. The process of smelting ores to obtain the uncarbonized metal or metal having a given degree of carbonization, which consists in stacking a furnace with layers of ore of a previously ascertained composition, alternating with layers of carbon, the amount of carbon in said layers being calculated to be consumed to the desired extent and to completely reduce the ore before reaching the fusing zone, and introducing at the said fusing zone of the furnace a mixture of oxygen, nitrogen and carbonic oxid calculated to produce the temperature required to bring the gangue of the ore to complete fusion.

2. The process of smelting ores to obtain the uncarbonized metal or metal having a given degree of carbonization, which consists in stacking a furnace with layers of ore of a previously ascertained composition, alternating with layers of carbon, the amount of carbon in said layers being calculated to be consumed to the desired extent and to completely reduce the ore before reaching the fusing zone, introducing at the said fusing zone of the furnace a mixture of oxygen, nitrogen and carbonic oxid calculated to produce the temperature required to bring the gangue of the ore to complete fusion, and introducing air into the furnace above said zone.

3. The process of smelting ores which consists in stacking a furnace with layers of ore of a previously determined composition, alternating with layers of carbon, the amount of carbon in said layers being calculated to be entirely consumed and to entirely reduce the ore before reaching the fusion zone, introducing at the said fusion zone a mixture of oxygen, nitrogen and carbonic oxid calculated to produce the temperature required to bring the gangue of the ore to complete fusion.

4. The process of smelting ores which consists in stacking a furnace with layers of ore of a previously determined composition, alternating with layers of carbon, the amount of carbon in said layers being calculated to be entirely consumed and to entirely reduce the ore before reaching the fusion zone, introducing at the said fusion zone a mixture of oxygen, nitrogen and carbonic oxid calculated to produce the temperature required to bring the gangue of the ore to complete fusion, and introducing air into the furnace above said zone.

5. The process of smelting ores to obtain the uncarbonized metal or metal having a given degree of carbonization, which consists in stacking a furnace with layers of ore of a previously ascertained composition, alternating with layers of carbon, the amount of carbon in said layers being calculated to be consumed to the desired extent and to completely reduce the ore before reaching the fusing zone, introducing at the said fusing zone of the furnace a mixture of oxygen, nitrogen and carbonic oxid calculated to produce the temperature required to bring the gangue of the ore to complete fusion, and blowing oxygenized air into the molten metal for further purification.

In testimony whereof I have signed this specification in the presence of two subscribing witnesses.

RAOUL PIERRE PICTET.

Witnesses:
HANSON C. COXE,
GASTON DE MESTRA.